United States Patent
Segura-Puchades

(10) Patent No.: US 7,667,753 B2
(45) Date of Patent: Feb. 23, 2010

(54) METHOD FOR PROCESSING INFORMATION DELIVERED BY A SENSOR PIXEL MATRIX OFFERING A WIDE DYNAMIC RANGE AND GAIN AND CORRESPONDING SENSOR

(75) Inventor: Josep Segura-Puchades, Fontaine (FR)

(73) Assignee: STMicroelectronics S.A., Montrouge (FR)

( * ) Notice: Subject to any disclaimer, the term of this patent is extended or adjusted under 35 U.S.C. 154(b) by 758 days.

(21) Appl. No.: 11/044,999

(22) Filed: Jan. 27, 2005

(65) Prior Publication Data
US 2005/0185078 A1 Aug. 25, 2005

(30) Foreign Application Priority Data
Feb. 6, 2004 (FR) .................................. 04 01181

(51) Int. Cl.
H04N 3/14 (2006.01)
H04N 5/335 (2006.01)

(52) U.S. Cl. ........................ 348/301; 348/308; 348/310; 250/208.1

(58) Field of Classification Search ................. 348/241, 348/300–302, 308–310
See application file for complete search history.

(56) References Cited

U.S. PATENT DOCUMENTS

| | | | | |
|---|---|---|---|---|
| 6,084,229 A * | 7/2000 | Pace et al. | ............... | 250/208.1 |
| 6,587,142 B1 * | 7/2003 | Kozlowski et al. | .......... | 348/241 |
| 6,642,543 B1 * | 11/2003 | El Gamal et al. | ............... | 257/72 |
| 6,670,598 B1 * | 12/2003 | Hosier et al. | ............. | 250/214 A |
| 7,286,174 B1 * | 10/2007 | Weale et al. | ................. | 348/308 |
| 7,502,059 B2 * | 3/2009 | Barna | .......................... | 348/300 |
| 2002/0011554 A1 * | 1/2002 | Brehmer et al. | .......... | 250/208.1 |
| 2003/0133627 A1 * | 7/2003 | Brehmer et al. | ............. | 382/308 |
| 2003/0193595 A1 * | 10/2003 | Henderson | ................... | 348/308 |

FOREIGN PATENT DOCUMENTS

| | | |
|---|---|---|
| EP | 1 026 880 | 8/2000 |
| EP | 1 351 490 | 10/2003 |

OTHER PUBLICATIONS

Patent Abstracts of Japan, vol. 2000, No. 06, Sep. 22, 2000; and JP 2000 075217, Nikon Corp., Mar. 14, 2000.
Preliminary French Search Report, FR 0401181, dated Jun. 18, 2004.

* cited by examiner

*Primary Examiner*—Ngoc-Yen T Vu
(74) *Attorney, Agent, or Firm*—Gardere Wynne Sewell LLP

(57) ABSTRACT

An image sensor includes a matrix of active pixels (PXA). A pair of sampling capacitors (C1) and (C2) per matrix column processes the information delivered by the active pixel matrix. Each matrix column further includes a differential amplifier configured in follower mode connected between the pixels of the column and the pair of sampling capacitors via a pair of switches (I1) and (I2).

5 Claims, 4 Drawing Sheets

METHOD FOR PROCESSING INFORMATION DELIVERED BY A SENSOR PIXEL MATRIX OFFERING A WIDE DYNAMIC RANGE AND GAIN AND CORRESPONDING SENSOR

PRIORITY CLAIM

This application claims priority from French Application for Patent No. 04 01181 filed Feb. 6, 2004, the disclosure of which is hereby incorporated by reference.

BACKGROUND OF THE INVENTION

1. Technical Field of the Invention

The present invention relates to the processing of signals delivered by a matrix of pixels of an image sensor.

2. Description of Related Art

An image sensor conventionally comprises a matrix of pixels. Each pixel delivers an electrical signal whose level depends on the quantity of light received by the pixel. This signal is conventionally stored in a pair of sampling capacitors then it is amplified in a read amplifier.

Currently, the circuits of systems for reading signals delivered by a pixel use a 0.34 µm technology with double-oxide transistors, supplied by 3.3 V. These transistors possess an acceptable operating dynamic range and gain.

Nevertheless, the appearance of new submicron technologies, for example a circuit using 0.18 µm technology, implies the use of single-oxide transistors with lower and lower supply voltages. As a result, the operating dynamic range is relatively limited since very little margin is left for the maximum signal attainable by the pixel.

A need accordingly exists to provide a solution to this problem.

Embodiments of the present invention propose a new reading system allowing a part of the dynamic range to be recovered and the gain to be increased for image sensors. The invention can be applied to pixels that use either double-oxide transistors or new submicron technologies, for example 0.18 µm, using thin-oxide (or single-oxide) transistors.

SUMMARY OF THE INVENTION

An embodiment of the invention is a method for processing information delivered by a matrix of active pixels.

According to one general feature of the invention, the method for processing information delivered by an active pixel matrix comprises, for each pixel, a read phase comprising a first amplification with unity gain of the voltage delivered by the pixel and a sampling of the amplified voltage in a pair of sampling capacitors.

Thus, the system response has a voltage gain close to unity with a significantly improved dynamic range.

Furthermore, according to one embodiment, the read phase comprises an additional amplification with unity gain between the first amplification and the sampling.

This allows a sufficiently high current for charging the sampling capacitors to be delivered when the pixel follower transistor is in a weakly inverted mode.

Another embodiment of the present invention is an image sensor, comprising a matrix of active pixels and means for processing the information delivered by this matrix of active pixels.

According to one general feature of the invention, the processing means comprise one pair of sampling capacitors per matrix column together with a differential amplifier configured in follower mode and connected between the pixels of the column and the pair of sampling capacitors.

According to one embodiment, each pixel of the image sensor comprises a photodiode and a follower transistor whose gate is connected to the photodiode. In addition, the differential amplifier of this same image sensor comprises:

a differential pair formed by the follower transistor of the pixel and an additional transistor, the source of the transistor being connected to a source of biasing current via a row-selection transistor, the source of the additional transistor being also connected to the said biasing current source, the drain of the additional transistor being fed back onto the gate of the additional transistor, a current mirror connected between the drain of the follower transistor and the drain of the additional transistor, and the gate of the follower transistor of each pixel of the image sensor matrix forms the positive input of the differential amplifier, whereas the gate of the additional transistor forms the negative input of the differential amplifier.

According to one embodiment of the invention, each pixel of the image sensor also comprises a reset transistor and, per matrix column, a pixel supply line to which are connected the reset transistors for the column pixels. Furthermore, this pixel supply line is distinct from the bit line to which is connected the differential amplifier of the image sensor.

According to one variant of the invention, each pixel of the image sensor matrix also comprises a reset transistor, the drain of the follower transistor and the reset transistor of each column pixel is connected to the bit line to which is connected the current mirror of the differential amplifier. Furthermore, this bit line is supplied via a controlled switch. In addition, the image sensor comprises control means capable of simultaneously turning on the reset transistor and closing the switch, then of simultaneously turning off the reset transistor and opening the switch.

According to one embodiment of the invention, the processing means also comprise an additional amplifier with unity gain connected between the output of the differential amplifier and the pair of sampling capacitors.

According to one embodiment of the invention, the follower transistor of each pixel is a double-oxide or a single-oxide transistor.

Another embodiment of the invention is a video acquisition device, such as a video camera, incorporating at least one image sensor of the type defined above.

According to another embodiment, a method of processing a voltage signal generated by a photo diode comprises reading the voltage signal using unity gain voltage amplification to output an amplified signal, and sampling the amplified signal in a pair of sampling capacitors.

Accordingly to yet another embodiment, an image sensor comprises a plurality of pixels, arranged in rows and columns, each pixel including a photodiode connected to an amplification transistor which is connected to a column bit line, and a differential amplifier for each column including a transistor that is connected with the amplification transistor of a selected pixel in the column to form a differential amplification transistor pair.

BRIEF DESCRIPTION OF THE DRAWINGS

Other advantages and features of the invention will become apparent upon examining the detailed description of the methods and embodiments of the invention, which are in no way limiting, and the appended drawings in which.

DETAILED DESCRIPTION OF THE DRAWINGS

Figure 1:
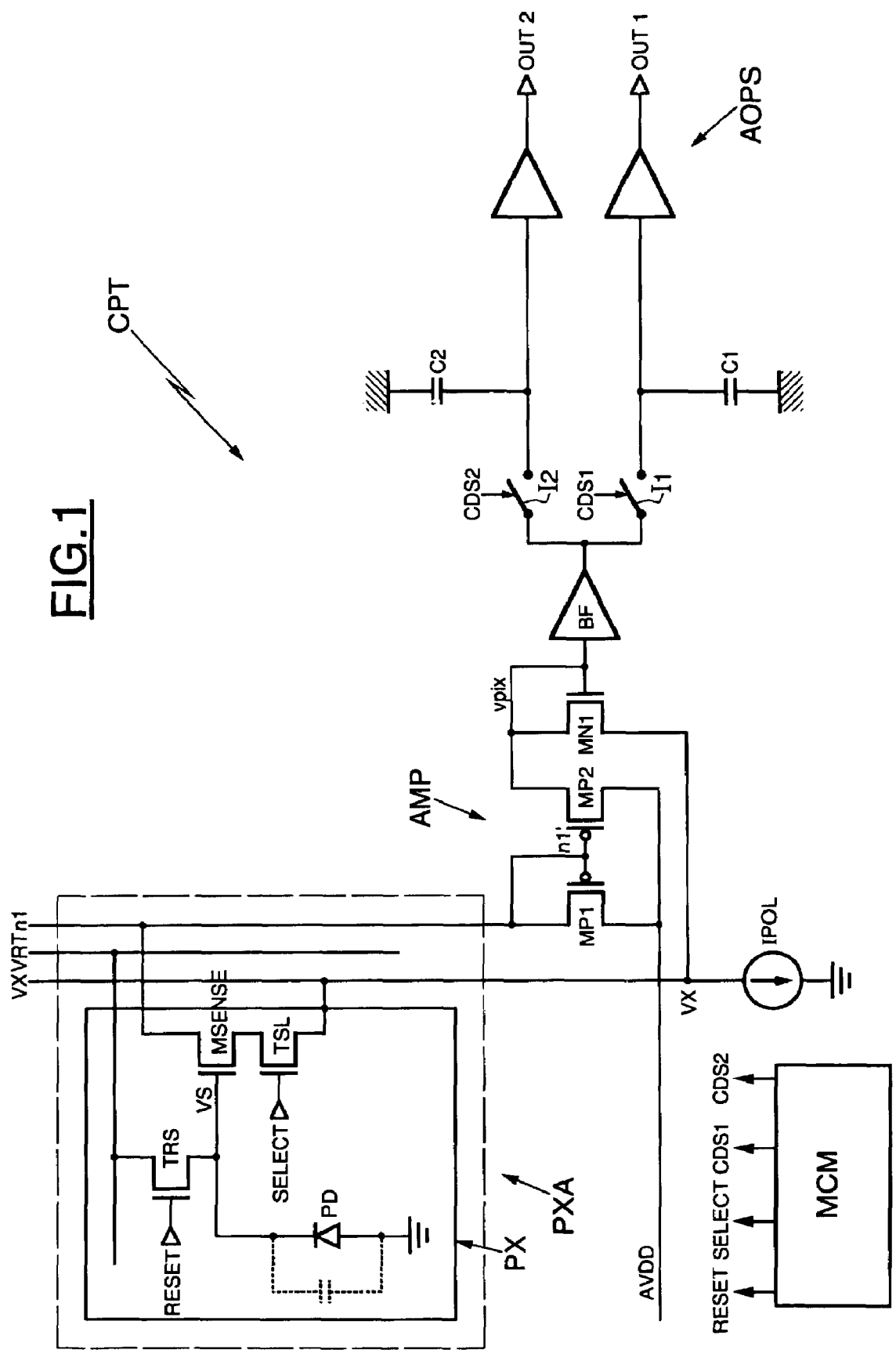
FIG. 1 shows a first embodiment of a sensor according to the invention.

A circuit diagram of the device according to an embodiment of the invention is shown in FIG. 1.

The reference CPT denotes an image sensor which can, for example, be incorporated in a video camera.

The image sensor CPT comprises a matrix of pixels PXA arranged in rows and columns.

The reference PX denotes the pixel of a column of the active pixel matrix of the image sensor.

The pixels of a same column are connected to the lines n1 and VX and to the supply line VRT.

A pair of sampling capacitors C1 and C2 is connected to the bottom end of the column via two controlled switches I1 and I2.

The two switches I1 and I2 are respectively controlled by the control signals CDS1 and CDS2 delivered by the control means MCM.

The other respective terminals of the sampling capacitors C1 and C2 are connected to ground.

The two terminals of the sampling capacitors C1 and C2 are also connected to an output amplifier AOPS. The amplifier AOPS can be a differential amplifier or else a simple transistor configured as a follower. The output amplifier AOPS delivers the output signals OUT1 and OUT2.

A column decoder (not shown here), which selects a column of the matrix PXA, is generally connected to the output of the output amplifiers AOPS.

Each pixel PX comprises a photodiode PD whose cathode is connected to the supply voltage VRT by way of a reset transistor TRS which is controlled by a signal RESET. The cathode of this photodiode PD is also connected to the gate of a follower transistor MSENSE connected to the bit line n1, independent from the supply line VRT, by way of a row selection transistor TSL which is controlled by a signal SELECT. The transistor MSENSE can be either a double-oxide transistor or a thin-oxide (or single-oxide) transistor.

The control means MCM deliver the SELECT and RESET signals for the row selection transistor TSL and the reset transistor TRS.

Furthermore, the pixel PX is said to be "active" because it contains an amplification device formed in this example by the follower transistor MSENSE.

The bias for the follower transistor MSENSE of the pixel PX is provided by the current source IPOL, on the line VX, when the transistor TSL is conducting.

The luminous intensity of the pixel is converted by the voltage VS at the terminals of the photodiode PD of the pixel PX.

When the row selection transistor TSL is conducting and, above a certain threshold (threshold voltage Vt), the voltage on VX is representative of the value of the voltage on the gate of the follower transistor MSENSE of the pixel PX.

For low voltage values of VS, the transistor MSENSE is weakly reverse biased and the current falls considerably.

A unity gain differential amplifier AMP configured in follower mode is connected between the pixel PX and the pair of sampling capacitors C1 and C2.

This differential amplifier AMP comprises a current mirror formed by the transistors MP1 and MP2 and a differential pair formed by the follower transistor MSENSE of the pixel PX and by the additional transistor MN1.

Figure 2:
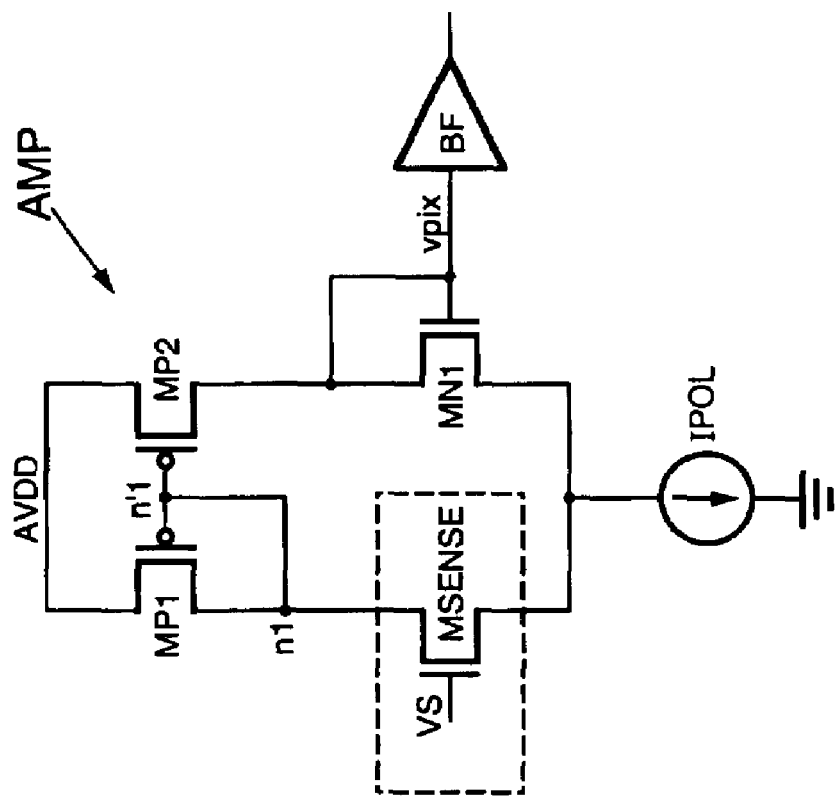
FIG. 2 shows in more detail the differential amplifier of the sensor in FIG. 1.

FIG. 2 shows the unity gain differential amplifier AMP for each of the matrix columns in more detail.

This unity gain differential amplifier delivers the signal vpix (the voltage vpix results from the conversion of the current carried by the line n1). It is configured as a follower, in other words its output is fed back into its inverting input. The differential pair consists of the follower transistor MSENSE of the pixel PX being considered and of an additional transistor MN1 also biased by the current source IPOL.

In addition, the gate of this additional transistor MN1 is fed back to its drain.

Furthermore, a current mirror, formed by the transistors MP1 and MP2, is connected between the drain of the follower transistor MSENSE and the drain of the additional transistor MN1.

The transistors MP1 and MP2 are supplied by the supply voltage AVDD to which they are connected through their source.

Figure 3:
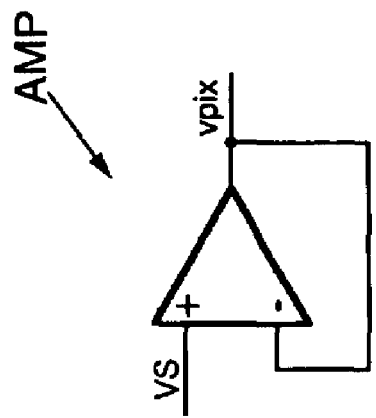
FIG. 3 shows, in the form of an equivalent circuit diagram, the differential amplifier in FIG. 2.

Accordingly, the unity gain differential amplifier in FIG. 2 can be symbolized by the circuit diagram in FIG. 3 with:

the gate of the follower transistor MSENSE of the pixel PX forming the positive input of the amplifier, VS being the input voltage, and the gate and the drain of the additional transistor MN1 are a feedback loop forming the negative input and the output of the differential amplifier.

During the processing phase of the information delivered by the pixel PX, the transistor MP1, configured as a diode, copies the current flowing through the follower transistor MSENSE of the pixel in the transistor MP2. The latter supplies this current to the additional transistor MN1 that has the same dimensions as the follower transistor MSENSE. Given that the same current flows through the additional transistor MN1 as flows through the follower transistor MSENSE, the drain potential of MN1 is identical to VS.

In addition, an additional unity gain amplifier (buffer) BF is inserted between this unity gain differential amplifier configured in follower mode AMP and the pair of sampling capacitors C1 and C2. This allows a sufficiently high current for charging the sampling capacitors to be supplied when the follower transistor of the pixel is weakly reverse biased.

Without this additional unity gain amplifier BF, the charging time for the sampling capacitors C1 and C2 would be much too long in the case of low currents.

Figure 4:
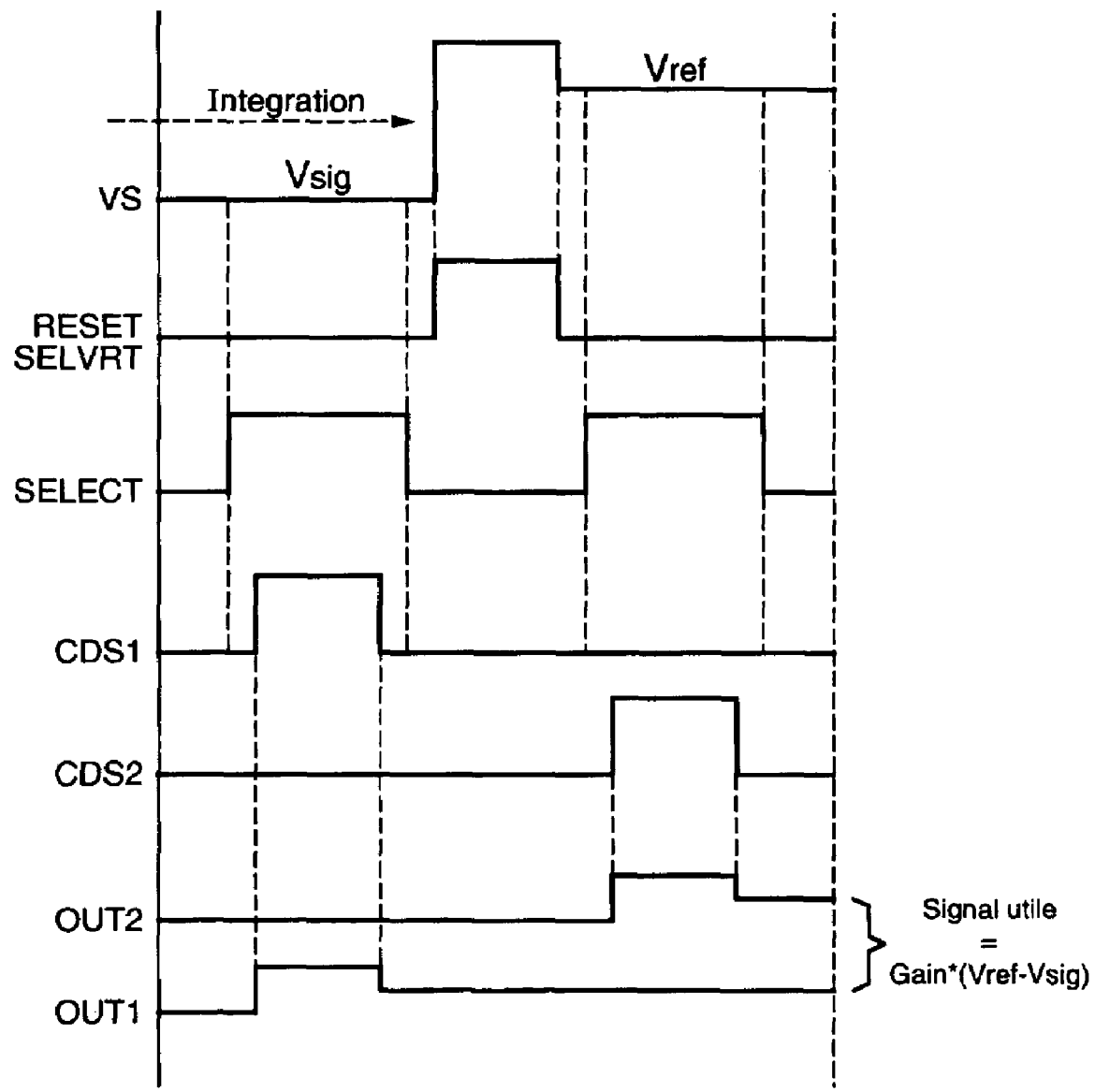
FIG. 4 shows a timing diagram of the operation phase of the sensor.

FIG. 4 shows the operational timing diagram for the circuit of the invention. This diagram presents the various stages in the reading of the signal delivered by the pixel PX.

The read phase comprises firstly an integration phase. The control means MCM close the row selection transistor TLS then the control signal CDS1 closes the sampling switch I1. While the switch I1 is closed, the sampling capacitor C1 is charged. On the falling edge of CDS1, the output signal OUT1 is measured.

Then, during the reset stage of the follower transistor MSENSE, the reset transistor TRS is closed by the control signal RESET, the connection between the transistor MSENSE and the potential VX is broken thanks to the operation of the row selection transistor TSL as a switch. During this reset phase, the switches I1 and I2 are open.

Finally, following the reset phase, the control means MCM close the row selection transistor TLS, then the control signal CDS2 closes the sampling switch I2. While the switch I2 is closed, the sampling capacitor C2 is charged. On the falling edge of CDS2, the output signal OUT2 is measured.

The useful signal at the output can then be calculated being equal to the difference between the signals OUT1 and OUT2, in other words equal to the multiplication of a gain of the amplifier AOPS by the difference between the two voltages $V_{ref}$ and $V_{sig}$.

Tests were carried out on a read system which did not use the circuit proposed by the present invention. For a maximum $V_{sense}$ value of 1.5 V, the dynamic range of the circuit is only 0.9 V, which means 0.6 V of wasted voltage range.

The results obtained with the read system of the present invention shows that a gain close to unity is obtained with a dynamic range increased by 0.5 V.

Figure 5:
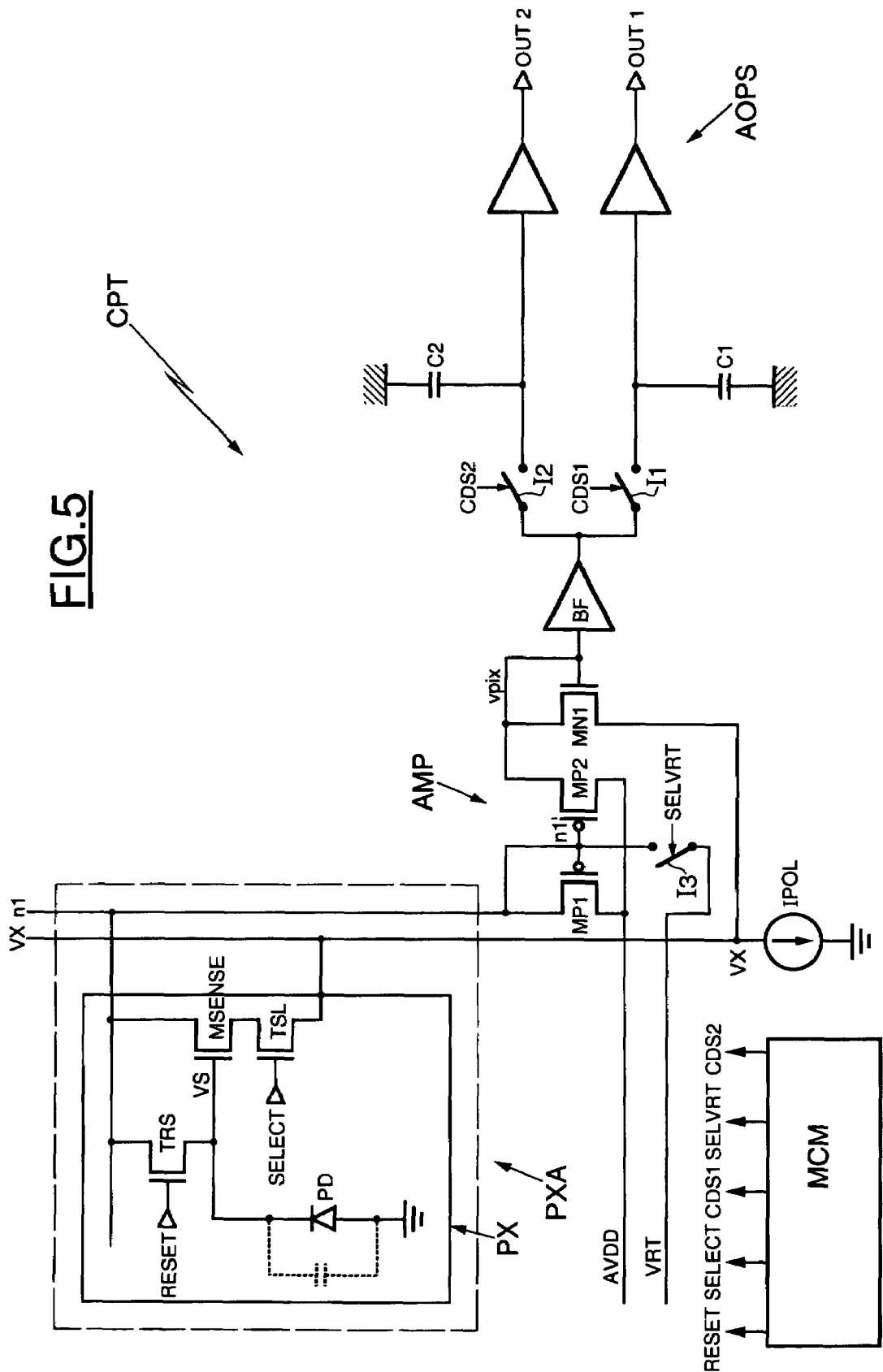
FIG. 5 illustrates a variant sensor embodiment according to the invention.

The variant illustrated in FIG. 1 comprises the separation of the supply VRT from the pixel PX. However, it is possible to only have a single wire for supplying the pixel PX as illustrated in FIG. 5.

The drain of the follower transistor MSENSE and the reset transistor TRS of each pixel of the column are then connected to the bit line n1 to which the differential amplifier current mirror is connected.

This bit line n1 is then supplied via a controlled switch I3 controlled by a signal SELVRT, situated in the supply line VRT and connected between the two gates of the current mirror transistors MP1 and MP2 at the node n1'.

The control means MCM deliver the signal SELVRT.

This controlled switch SELVRT and the reset transistor TRS switch simultaneously as shown on the timing diagram in FIG. 4.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An image sensor, comprising:
   a matrix of active pixels, wherein each pixel comprises a photodiode and a follower transistor whose gate is connected to the photodiode;
   one pair of sampling capacitors per matrix column for processing the information delivered by the matrix of active pixels;
   a differential amplifier per matrix column configured in follower mode and connected between the pixels of the column and the pair of sampling capacitors via a pair of switches; and
   an additional amplifier with unity gain connected between the output of the differential amplifier and the pair of switches associated with the sampling capacitors, the additional amplifier sourcing current for sufficiently and quickly charging the capacitors;
   wherein the differential amplifier configured in follower mode comprises:
      a differential pair comprising the follower transistor of the pixel and an additional transistor, the source of the follower transistor being connected to a source of biasing current via a row-selection transistor, the source of the additional transistor being also connected to the said biasing current source, the drain of the additional transistor being fed back onto the gate of the additional transistor, and
      a current mirror connected between the drain of the follower transistor and the drain of the additional transistor,
   wherein the gate of the follower transistor of the pixel forms the positive input of the differential amplifier and the gate of the additional transistor forms the negative input of the differential amplifier.

2. The image sensor according to claim 1, wherein each pixel also comprises a reset transistor, the sensor further comprising, per matrix column, a pixel supply line to which are connected the reset transistors for the column pixels, and in that this supply line is distinct from a bit line to which is connected the differential amplifier.

3. The image sensor according to claim 1, wherein each pixel also comprises a reset transistor, and wherein the drain of the follower transistor and the reset transistor of each column pixel are connected to a bit line to which is connected the current mirror of the differential amplifier, and wherein this bit line is supplied via a controlled switch, and wherein the sensor comprises control means operable to simultaneously turn on the reset transistor and close the switch, then simultaneously turn off the reset transistor and open the switch.

4. The image sensor according to claim 1, wherein the follower transistor of each pixel is a double-oxide or single-oxide transistor.

5. The image sensor according to claim 1, wherein the sensor is included within a video camera device.

* * * * *

UNITED STATES PATENT AND TRADEMARK OFFICE
CERTIFICATE OF CORRECTION

PATENT NO. : 7,667,753 B2 Page 1 of 1
APPLICATION NO. : 11/044999
DATED : February 23, 2010
INVENTOR(S) : Josep Segura-Puchades It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1429 days.

Signed and Sealed this

Seventh Day of December, 2010

David J. Kappos
*Director of the United States Patent and Trademark Office*